US012627805B2

(12) United States Patent
Kadu

(10) Patent No.: US 12,627,805 B2
(45) Date of Patent: May 12, 2026

(54) CODING FRAMEWORK FOR IMAGE-RELATED PARAMETERS

(71) Applicant: Samsung Display Co., Ltd., Yongin-si (KR)

(72) Inventor: Harshad Kadu, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 63 days.

(21) Appl. No.: 18/632,110

(22) Filed: Apr. 10, 2024

(65) Prior Publication Data

US 2025/0254312 A1 Aug. 7, 2025

Related U.S. Application Data

(60) Provisional application No. 63/549,321, filed on Feb. 2, 2024.

(51) Int. Cl.
H04N 19/13 (2014.01)
H04N 19/186 (2014.01)
H04N 19/46 (2014.01)

(52) U.S. Cl.
CPC ........... H04N 19/13 (2014.11); H04N 19/186 (2014.11); H04N 19/46 (2014.11)

(58) Field of Classification Search
None
See application file for complete search history.

(56) References Cited

U.S. PATENT DOCUMENTS

| | | | |
|---|---|---|---|
| 9,591,320 B2 | 3/2017 | Budagavi et al. | |
| 11,330,271 B2 | 5/2022 | Hannuksela | |
| 11,405,641 B2 | 8/2022 | Rosewarne | |
| 11,805,268 B2 | 10/2023 | Zhang et al. | |
| 2012/0140822 A1* | 6/2012 | Wang | H04N 19/197 375/240.18 |
| 2013/0058407 A1* | 3/2013 | Sole Rojals | H04N 19/184 375/240.18 |
| 2015/0016537 A1* | 1/2015 | Karczewicz | H04N 19/176 375/240.18 |
| 2018/0035133 A1 | 2/2018 | Sasai et al. | |
| 2018/0192052 A1 | 7/2018 | Xu | |
| 2019/0349600 A1 | 11/2019 | Sasai et al. | |
| 2021/0058640 A1 | 2/2021 | Coban et al. | |
| 2023/0308686 A1 | 9/2023 | Kim et al. | |
| 2024/0406401 A1* | 12/2024 | Li | H04N 19/136 |

* cited by examiner

*Primary Examiner* — Talha M Nawaz
(74) *Attorney, Agent, or Firm* — Lewis Roca Rothgerber Christie LLP

(57) ABSTRACT

A system and a method are disclosed for processing data. The method includes receiving, by a decoding circuit, a first input bitstream including a first set of coefficients associated with a first group of pixels of a display device, the first set of coefficients having a first format that is different from a second format associated with an output data of the decoding circuit, a first portion indicating that one or more of the coefficients in the first set have absolute values that are greater than zero, and a second portion indicating that a plurality of consecutive coefficients in the first set have absolute values that are less than or equal to a first value, and changing image data for displaying an image on the display device, based on the first input bitstream.

20 Claims, 12 Drawing Sheets

BL

| E0 | E1 | E2 | E3 | E4 | E5 | E6 | E7 |
|---|---|---|---|---|---|---|---|
| -1 | 1 | 0 | 0 | 0 | 0 | 0 | 0 |

CV → Coefficient Values
ECP → Prefix
ECS → Suffix (Length)

| Coefficient Values | Prefix | Suffix (Length) |
|---|---|---|
| 0 | 0 | - |
| 1 | 10 | - |
| 2-3 | 110 | x (1) |
| 4-7 | 1110 | xx (2) |
| 8-15 | 11110 | xxx (3) |
| 16-31 | 111110 | xxxx (4) |
| 32-63 | 1111110 | xxxxx (5) |
| 64-127 | 11111110 | xxxxxx (6) |
| 128-255 | 111111110 | xxxxxxx (7) |
| 256-511 | 1111111110 | xxxxxxxx (8) |

Display device

2

Processing circuit

4

Natural image data

7

Buffer

260

Codec

250

Memory

6

MCA-parameter data

10

G1    Gn-1    Gn+1

Gn

C    PX    G

R

SP | SP    SP | SP

SP    SP

PX1    PXn

Display

| E0 | E1 | E2 | E3 | E4 | E5 | E6 | E7 | E8 | E9 | E10 | E11 | E12 | E13 | E14 | E15 |
|----|----|----|----|----|----|----|----|----|----|-----|-----|-----|-----|-----|-----|
| 73 | 0 | 0 | 1 | -1 | 1 | 0 | 0 | -1 | 1 | 0 | -1 | 1 | 0 | 0 | 0 |

LSP                    HC

| Last Significant Position | Huffman Code (Length) |
|---------------------------|------------------------|
| 0 | 0011 (4) |
| 1 | 01001 (5) |
| 2 | 0000 (4) |
| 3 | 0001 (4) |
| 4 | 0101 (4) |
| 5 | 100 (3) |
| 6 | 101(3) |
| 7 | 110 (3) |
| 8 | 111 (3) |
| 9 | 0111 (4) |
| 10 | 0010 (4) |
| 11 | 01101 (5) |
| 12 | 01000 (5) |
| 13 | 011001 (6) |
| 14 | 0110001 (7) |
| 15 | 0110000 (7) |

CV          ECP          ECS

| Coefficient Values | Prefix | Suffix (Length) |
|---|---|---|
| 0 | 0 | - |
| 1 | 10 | - |
| 2-3 | 110 | x (1) |
| 4-7 | 1110 | xx (2) |
| 8-15 | 11110 | xxx (3) |
| 16-31 | 111110 | xxxxx (4) |
| 32-63 | 1111110 | xxxxx (5) |
| 64-127 | 11111110 | xxxxxx (6) |
| 128-255 | 111111110 | xxxxxxx (7) |
| 256-511 | 1111111110 | xxxxxxxx (8) |

14

Significance Map

ECP     ECS
73

01000  00111001101          1          11111110001001 00101010

Loc: 12(5)          NMLC Flag          Absolute Values and Sign Bits are Interleaved

LSP          SM          NMLC          CV          SNB

400

| Coefficient Values | Prefix | Suffix (Length) |
|---|---|---|
| 0 | 0 | - |
| 1 | 10 | - |
| 2-3 | 110 | x (1) |
| 4-7 | 1110 | xx (2) |
| 8-15 | 11110 | xxx (3) |
| 16-31 | 111110 | xxxx (4) |
| 32-63 | 1111110 | xxxxx (5) |
| 64-127 | 11111110 | xxxxxx (6) |
| 128-255 | 111111110 | xxxxxxx (7) |
| 256-511 | 1111111110 | xxxxxxxx (8) |

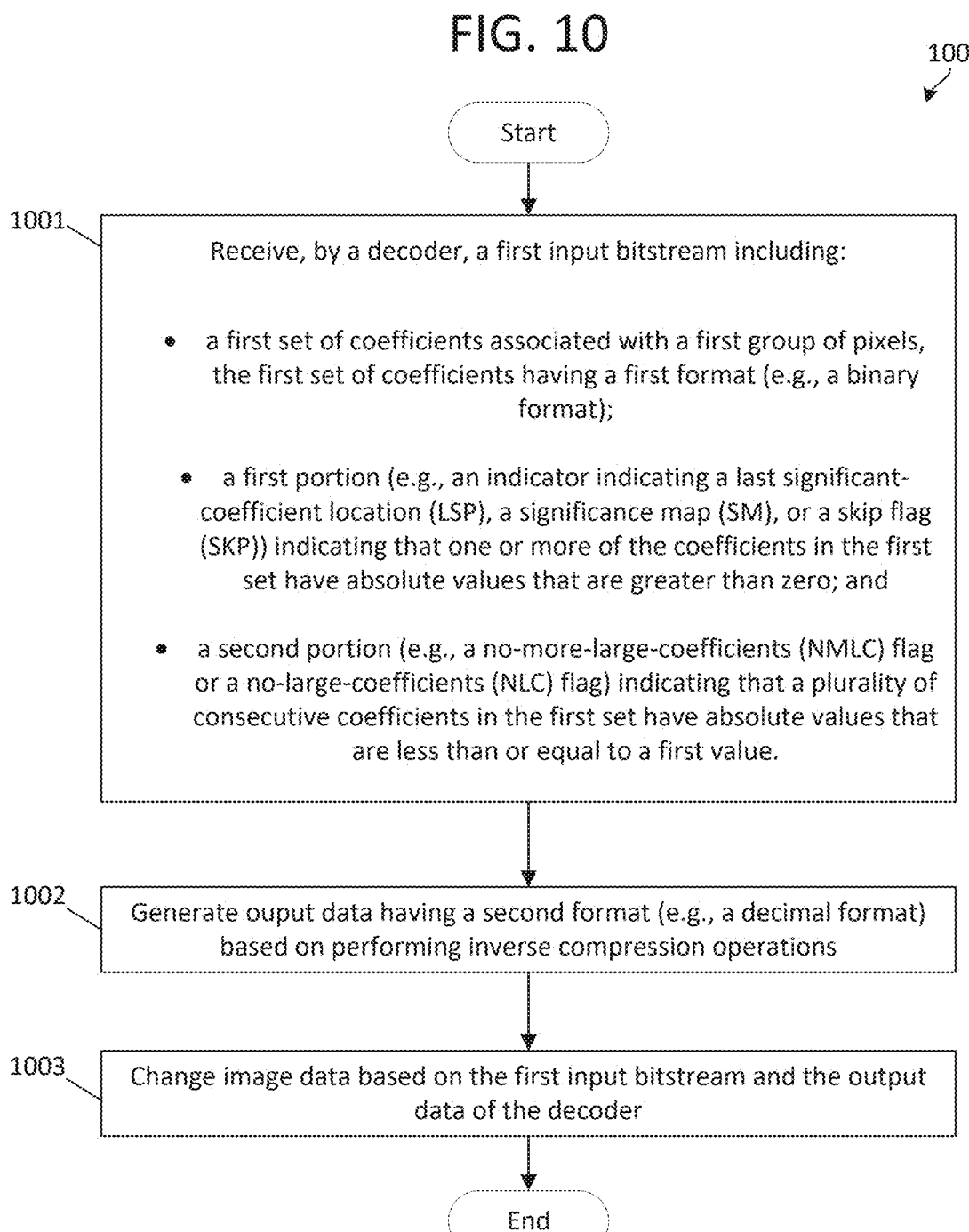

Start

1001

Receive, by a decoder, a first input bitstream including:

- a first set of coefficients associated with a first group of pixels, the first set of coefficients having a first format (e.g., a binary format);

- a first portion (e.g., an indicator indicating a last significant-coefficient location (LSP), a significance map (SM), or a skip flag (SKP)) indicating that one or more of the coefficients in the first set have absolute values that are greater than zero; and

- a second portion (e.g., a no-more-large-coefficients (NMLC) flag or a no-large-coefficients (NLC) flag) indicating that a plurality of consecutive coefficients in the first set have absolute values that are less than or equal to a first value.

1002

Generate ouput data having a second format (e.g., a decimal format) based on performing inverse compression operations

1003

Change image data based on the first input bitstream and the output data of the decoder End

CODING FRAMEWORK FOR IMAGE-RELATED PARAMETERS

CROSS-REFERENCE TO RELATED APPLICATION

This application claims the priority benefit under 35 U.S.C. § 119 (e) of U.S. Provisional Application No. 63/549,321, filed on Feb. 2, 2024, the disclosure of which is incorporated by reference in its entirety as if fully set forth herein.

TECHNICAL FIELD

The disclosure generally relates to displays. More particularly, the subject matter disclosed herein relates to improvements to processing compensation parameters for improving the quality of an image displayed on a display device.

SUMMARY

Compensation parameters for improving the quality of an image to be displayed on a display device may include parameters for a mura compensation algorithm (MCA). Compensation parameters may allow for a reduction in mura defects in a display of a display device. As used herein, "mura" refers to a non-uniform brightness and/or non-uniform chromaticity of pixels on a display, which may result from the manufacturing process. Mura defects may manifest themselves (e.g., may be observed) when an image of uniform brightness is displayed on the display. For example, mura defects may be detected when an image of uniform brightness is displayed but the pixels show different brightnesses.

During the manufacturing process, mura-related defects may be captured in an image. An MCA may use parameters derived from the captured image to compensate for mura.

MCA parameters may be mapped to an image (e.g., an MCA-parameter image), the MCA parameters may be compressed and stored in the display device. Compressing MCA parameters may be significantly different from compressing natural-image data. For example, MCA parameters may include data that is not typical natural image data.

MCA parameters may include three values corresponding to each pixel in the image. However, instead of allowing a natural image to be displayed, the MCA parameters provide information for how to adjust luma (e.g., grayscale) components and/or chroma (e.g., color) components of an image to be displayed on a display device, such that the quality of a displayed picture may be improved. As such, MCA parameters may exhibit characteristics that are different from characteristics of natural-image data.

For example, MCA parameters may be relatively random, when compared to natural-image data, and may change more quickly (e.g., more dramatically) from one pixel to the next. Additionally, noise-like high frequency components of an MCA-parameter image may be important for compensating mura.

Codecs (e.g., image and/or video compression codecs) for use with natural image data may not be suitable (e.g., may not be ideal or optimal) for compressing MCA parameters. As used herein, a "codec" refers to a device or program configured to compress and/or decompress image-related data. Although MCA parameters may be stored like a natural image, compressing MCA parameters with a natural-image codec may result in unsatisfactory performance.

To overcome these issues, systems and methods are described herein for improved codecs for compressing MCA parameters. Although the present disclosure refers to codecs for compressing MCA parameters, aspects of some embodiments of the present disclosure may be useful for improving codecs for processing natural image data.

In some embodiments, a method comprises converting input data from a first format to a second format by encoding portions of the input data with a no-more-large-coefficients flag or with a no-large-coefficients flag.

Aspects of some embodiments of the present disclosure improve on previous methods by allowing MCA-parameter images to be compressed and reconstructed more accurately than with previous methods, while using the same number of bits. A more accurately reconstructed MCA-parameter image, in turn, may allow for improved picture quality as observed on a display device.

Aspects of some embodiments of the present disclosure allow for parallel encoding and/or decoding based on separating out different components of binary data and encoding the different components in separate bitstreams.

According to some embodiments of the present disclosure, there is provided a method for processing data including receiving, by a decoding circuit, a first input bitstream including a first set of coefficients associated with a first group of pixels of a display device, the first set of coefficients having a first format that is different from a second format associated with an output data of the decoding circuit, a first portion indicating that one or more of the coefficients in the first set have absolute values that are greater than zero, and a second portion indicating that a plurality of consecutive coefficients in the first set have absolute values that are less than or equal to a first value, and changing image data for displaying an image on the display device, based on the first input bitstream.

The plurality of consecutive coefficients may include all the coefficients in the first set, the second portion includes a no-large coefficients (NLC) flag, and the first set may correspond to a chroma channel associated with the first group of pixels.

The plurality of consecutive coefficients may include all the coefficients in the first set following a first coefficient of the first set, the second portion may include a no-more-large coefficients (NMLC) flag, and the first set may correspond to a luma channel associated with the first group of pixels.

The first value may be one.

The first portion may include at least one of an indicator indicating a last significant-coefficient location, a significance map, or a skip flag.

The first portion may include the indicator indicating the last significant-coefficient location, and the indicator may be encoded in accordance with a Huffman codebook.

The first portion may include the significance map, and the significance map may include bits representing each coefficient in the first set, from a first coefficient to a last significant coefficient, except for bits representing the first coefficient or the last significant coefficient.

The first portion may include the significance map, and the significance map may include one or more significant bits and one or more last-bit indicator bits, one of the one or more last-bit indicator bits indicating that an adjacent significant bit is a last significant bit.

The first set may correspond to a chroma channel associated with the first group of pixels, the first portion may include the skip flag in a first state, and the skip flag may be configured to indicate, in a second state, that all of the coefficients in the first set are equal to zero.

The method may further include generating the first input bitstream based on a first combined bitstream including the first portion associated with the first set of coefficients associated with the first group of pixels and including a first portion associated with a second set of coefficients associated with a second group of pixels, and a second combined bitstream including the second portion associated with the first set of coefficients associated with the first group of pixels and including a second portion associated with the second set of coefficients associated with the second group of pixels.

The generating the first input bitstream based on the first combined bitstream and the second combined bitstream may include performing a decompression operation on the first combined bitstream or the second combined bitstream.

The decompression operation may include an inverse binary arithmetic coding (BAC) operation or an inverse run-length coding (RLC) operation.

The first input bitstream may include a third portion including indicator bits indicating absolute values of one or more of the coefficients in the first set interleaved with indicator bits indicating signs of the one or more of the coefficients in the first set.

The absolute values may be encoded in accordance with an Exponential-Golomb codebook.

The first set may correspond to a luma channel associated with the first group of pixels, a first coefficient in the first set may be represented by an encoded form of its actual absolute value, and at least one of the coefficients in the first set, following the first coefficient of the first set, may have an absolute that is represented by an encoded form of a value that is equal to an absolute value of the at least one of the coefficients minus one.

The first set may correspond to a luma channel associated with the first group of pixels, and the method may further include decoding the first set based on assuming that an absolute value of a first coefficient of the luma channel is significant.

According to other embodiments of the present disclosure, there is provided a system for processing data including a processing circuit, and a memory storing instructions, which, when executed by the processing circuit, cause the processing circuit to perform receiving, at a decoder, a first input bitstream including a first set of coefficients associated with a first group of pixels of a display device, the first set of coefficients having a first format that is different from a second format associated with an output data of the decoder, a first portion indicating that one or more of the coefficients in the first set have absolute values that are greater than zero, and a second portion indicating that a plurality of consecutive coefficients in the first set have absolute values that are less than or equal to a first value, and changing image data for displaying an image on the display device, based on the first input bitstream.

The plurality of consecutive coefficients may include one of all the coefficients in the first set, or all the coefficients in the first set following a first coefficient of the first set.

According to other embodiments of the present disclosure, there is provided a system for processing data including processing circuit, and a memory storing instructions, which, when executed by the processing circuit, cause the processing circuit to perform receiving, at an encoder, input data including a first set of coefficients associated with a first group of pixels of a display, the first set of coefficients having a first format, generating a first output bitstream, representing the first set of coefficients in a second format that is different from the first format, the first output bitstream including a first portion indicating that one or more of the coefficients in the first set have absolute values that are greater than zero, and a second portion indicating that a plurality of consecutive coefficients in the first set have absolute values that are less than or equal to a first value, and changing image data, for displaying an image on the display, based on the first output bitstream.

The plurality of consecutive coefficients may include one of all the coefficients in the first set, or all the coefficients in the first set following a first coefficient of the first set.

BRIEF DESCRIPTION OF THE DRAWING

In the following section, the aspects of the subject matter disclosed herein will be described with reference to exemplary embodiments illustrated in the figures.

FIG. 2 is a block diagram depicting an encoder and a decoder of a codec, according to some embodiments of the present disclosure.

FIG. 10 is a flowchart depicting a method for processing data by a decoder, according to some embodiments of the present disclosure.

DETAILED DESCRIPTION

Figure 1A:
FIG. 1A is a block diagram depicting a display device, according to some embodiments of the present disclosure.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the terms "or" and "and/or" include any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1A is a block diagram depicting a display device, according to some embodiments of the present disclosure.

Referring to FIG. 1A, a system 1 may include a display device 2 (e.g., a display panel), a processing circuit 4, a memory 6, and a display 8 (e.g., a display area). The display device 2 may correspond to the electronic device 801 and/or the display device 860 of FIG. 8. The processing circuit 4 may correspond to the processor 820 of FIG. 8. The memory 6 may correspond to the memory 830 of FIG. 8. The display device 2 may include a plurality of pixels PX capable of displaying (i.e., configured to display) an image. As used herein, the terms display device and display may be used interchangeably and may be (or may be included in) a television, a computer, a computer monitor, a mobile phone, a portable device, a tablet, a game console, a navigation device, and/or the like. The pixels PX may include a plurality of subpixels SP. The subpixels SP may be configured to display different colors of light. For example, a first subpixel SP may be configured to display red light, a second subpixel SP may be configured to display green light, and a third subpixel, may be configured to display blue light. The pixels PX and/or the subpixels SP may be arranged according to a pixel-arrangement structure. The subpixels SP may come in different quantities, shapes, and/or positions than depicted in FIG. 1A. In some embodiments, the pixels PX may include a PenTile pixel-arrangement structure. Each pixel PX may be associated with a luma channel and chroma channel. As used herein, a "luma channel" refers to a data stream (e.g., a portion of data) associated with a brightness or grayscale of a portion of an image. As used herein, a "chroma channel" refers to a data stream (e.g., a portion of data) associated with a color of a portion of an image.

Data corresponding to the pixels PX may be processed based on pixel groups G (e.g., a block of pixels). Each pixel group G may include rows R of pixels PX and columns C of pixels PX. Each pixel group G may include the same number of rows R and columns C. For example, a pixel group Gn may have the same number of rows R and columns C as a first pixel group G1. In some embodiments, if there are fewer rows and/or columns in some pixel groups (e.g., at the edges of a display), zeros may be added to the pixel data of such pixel groups, such that the pixel groups with fewer rows and/or columns may have the same size as the other pixel groups. In some embodiments, a pixel group G may include one row R and 16 columns C of pixels PX (e.g., a 1×16 group). For example, each pixel group G may include a first pixel PX1 through a sixteenth pixel PX16 (e.g., an n-th pixel PXn of the pixel group G may be the sixteenth pixel PX16). In some embodiments, the luma channels and chroma channels corresponding to each pixel group may depend on a format (e.g., a pixel-arrangement structure) associated with the pixels PX. In some embodiments, RGB or YUV444 format may have 16 elements in each of the luma channels and chroma channels. In some embodiments, PenTile or YUV422 format may have 16 elements in the luma channel and 8 elements in each of two chroma channels. The data corresponding to the pixels PX may be processed from left to right and from top to bottom with respect to the pixel groups G. For example, a first pixel group G1 in the top left portion of the display 8 may be processed first, and an x-th pixel group Gx (x being a positive integer) in the bottom right portion of the display 8 may be processed last. An n-th pixel group Gn may be processed after an n−1-th pixel group Gn−1 and before an n+1-th pixel group Gn+1. The display 8 may include many pixel groups G. For example, the display may include about 100,000 pixel groups. As such, a reduction of one bit to represent the data for one pixel group can account for a significant reduction in bits to represent pixel groups G for the entire display 8.

The processing circuit 4 may process the data for displaying images on the display device 2. For example, the processing circuit 4 may process natural image data 7 for displaying a natural image on the display 8. As used herein, a "natural image" refers to an image that is presented on the display device 2 for viewing by an observer. Contrastingly, an MCA-parameter image corresponds to data that can be processed by the processing circuit 4 to change (e.g., to adjust, to modify, or to correct) natural image data 7 to be presented with a higher visual quality when displayed on the display device 2. The memory 6 may store MCA-parameter data 10 (e.g., compressed MCA parameter data) that is processed by the processing circuit 4. The processing circuit 4 may use a codec 250 for decompressing the compressed MCA-parameter data 10 in the memory 6. The processing circuit 4 may use a buffer 260 to assist the codec 250 in processing the natural image data 7 and/or in processing MCA parameters. For example, in real time, the codec 250 may decode the MCA-parameter data 10 and adjust the natural image data 7 using the decoded MCA parameter data. The display device 2 may use the adjusted natural image data for displaying an improved natural image on the display 8. In some embodiments, the display 8 may only include a decoder portion of the codec 250. For example, an encoder 252 (see FIG. 2) of the codec 250 may be used to compress MCA-parameters during a manufacturing process, while a decoder 254 (see FIG. 2) of the codec 250 may be used to decode (e.g., to decompress) the MCA-parameter data 10 in a frame (e.g., in every frame) to display an image on the display 8 (see FIG. 1). That is, the codec 250 may include a coding and/or decoding architecture (e.g., an entropy-coding architecture) for improved processing of MCA parameters.

The codec 250 may decode the MCA-parameter data 10 for each frame because the compressed MCA-parameter data 10 consumes less space (e.g., significantly less space) in the memory 6 than decompressed MCA parameters. For example, decoding may be performed section by section to avoid consuming larger amounts of space in the memory 6 with a full set of decompressed (e.g., uncompressed) MCA parameters. The codec 250 may adjust the natural image data 7 with the decoded (e.g., decompressed) MCA parameter data using the buffer 260. For example, output data from the decoder 254 may be combined with the natural image data 7 using the buffer 260.

Figure 1B:
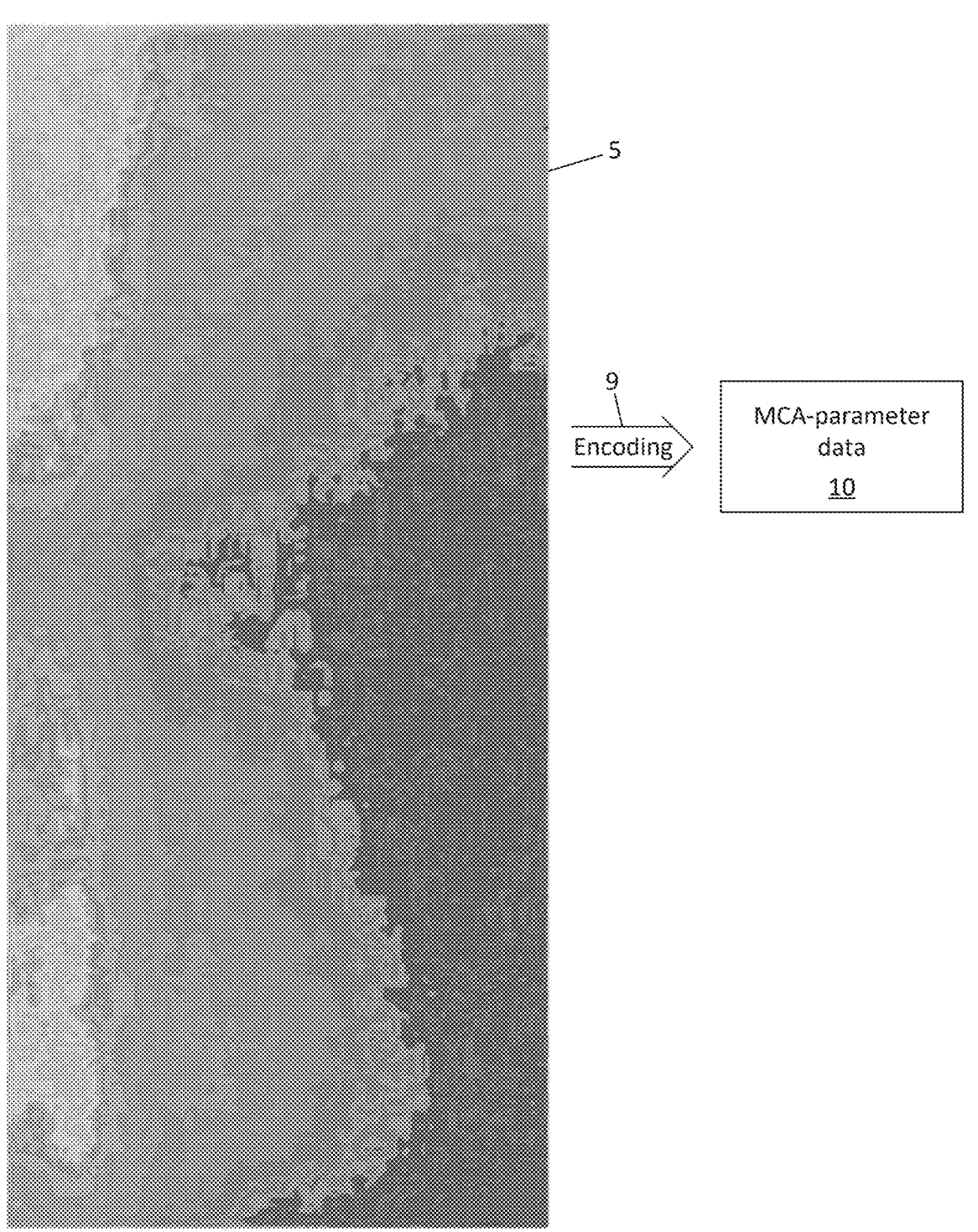
FIG. 1B is a block diagram depicting an example of an MCA-parameter image, according to some embodiments of the present disclosure.

FIG. 1B is a block diagram depicting an example of an MCA-parameter image, according to some embodiments of the present disclosure.

Referring to FIG. 1B, MCA-parameter data 10 (e.g., compressed MCA-parameter data) associated with an MCA-parameter image 5 may be used to compensate for mura defects of a display device. As discussed above, mura defects may manifest themselves (e.g., may be observed) when an image of uniform brightness is displayed on the display. During the manufacturing process, mura-related defects may be captured in an image. MCA parameters may be derived from the captured image to compensate for mura. For example, image data having a uniform brightness level of 172 may be displayed on the display device. It may be determined that some portions of the image display a level of 171 and some portions of the image display a level of 173. MCA parameters may be derived to indicate that the portions of the image displaying the level of 171 may be adjusted by +1 and that the portions of the image displaying the level of 173 may be adjusted by −1 to compensate for mura and display a higher quality image on the display device. The MCA parameters associated with the MCA-parameter image 5 may be compressed by encoding operations 9 (e.g., compression operations) to generate the MCA-parameter data 10 that is stored in the memory 6 (see FIG. 1A). The encoding operations 9 are discussed in further detail below with reference to FIGS. 2-7B and 9. Decoding operations 19 (see FIG. 2), which include inverse operations of the encoding operations 9, are discussed in further detail below with reference to FIGS. 2, 7A, 7B, and 10.

Figure 2:
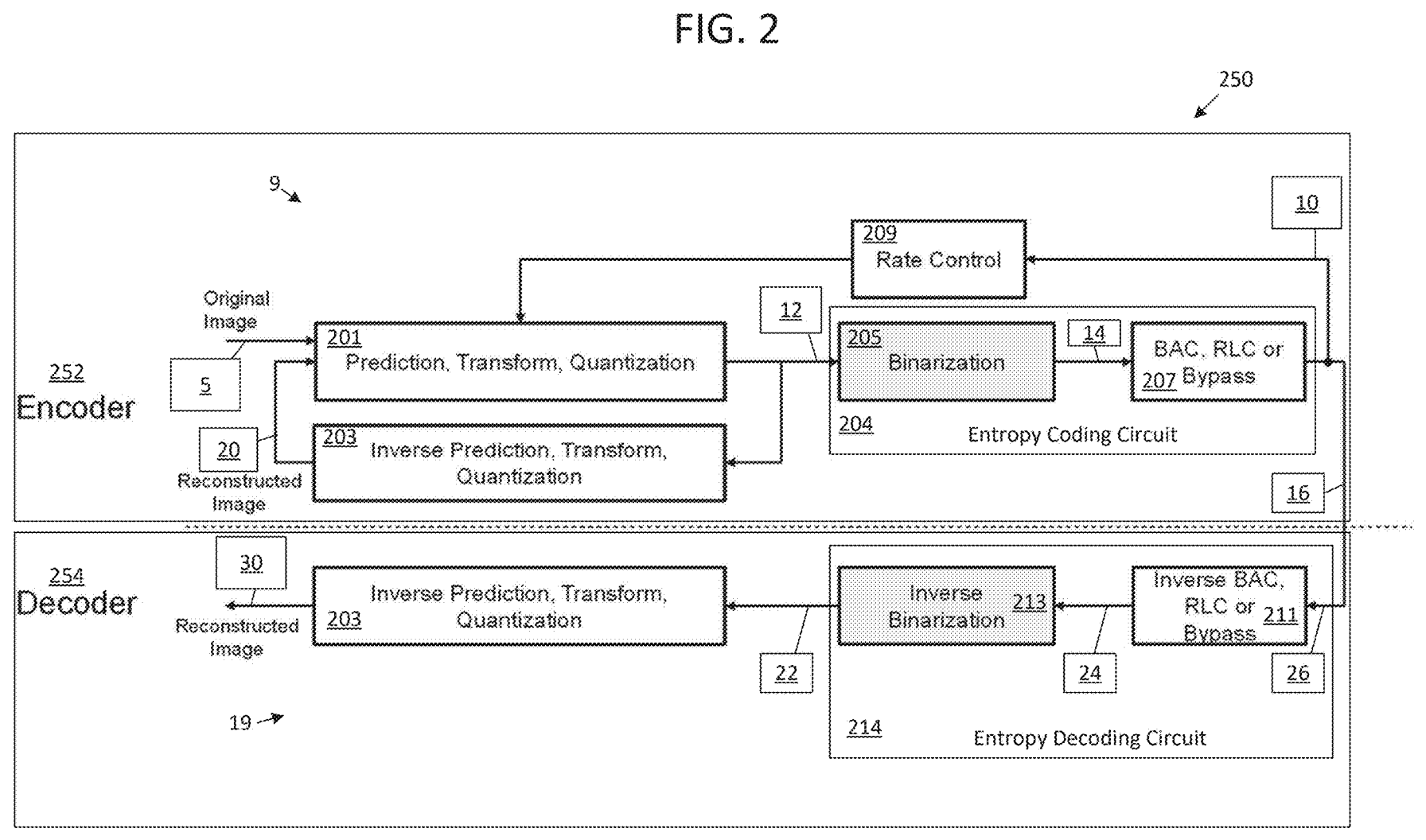

FIG. 2 is a block diagram depicting an encoder and a decoder, according to some embodiments of the present disclosure.

Referring to FIG. 2, the codec 250 may include an encoder 252. The encoder 252 (e.g., an image-compression encoder) may process the MCA-parameter image 5 (e.g., an original, uncompressed version of the MCA-parameter data 10). For example, the encoder 252 may perform prediction, transformation (e.g., using a discrete cosine transform (DCT)) of prediction error, quantization of transform coefficients, and entropy coding based on the quantized coefficients. For example, a prediction, transform, and quantization component 201 (hereinafter, a "PTQ 201") may perform prediction operations to predict MCA parameters for a next portion of pixel groups based on a previous portion of pixel groups. The PTQ 201 may perform transformation operations of prediction errors resulting from the prediction operations. The transformation may shift the errors from the spatial domain to the frequency domain, such that most of the error information that is represented by coefficients gets compacted into the first few elements of a block of quantized coefficients BL (see FIGS. 3A and 5A). The PTQ 201 may perform quantization operations on the transform coefficients to generate quantized coefficients. For example, transformed prediction-error coefficients may be truncated to generate the quantized coefficients for further processing by the encoder 252. An output of the PTQ 201 may be provided to an inverse PTQ 203. The inverse PTQ 203 may provide intermediate reconstructed image data 20 to the PTQ 201.

The output of the PTQ 201 may be provided to a coding circuit 204 (e.g., an entropy coding circuit). As used herein, a "coding circuit" refers to a device or program (e.g., a portion of a program) configured to convert a symbol having a first format to a representation, of the symbol, having a second format. The coding circuit 204 may correspond to the processor 820 of FIG. 8. The coding circuit 204 may include a binarization component 205 and an additional compression component 207. The binarization component 205 may convert input data 12 to a different format (e.g., to a binary format). For example, the input data 12 may include quantized coefficients (e.g., quantized DTC coefficients) as floating-point values. For example, the quantized coefficients may be positive and/or negative decimal representations of values associated with the MCA-parameter image 5. The binarization component 205 may convert the quantized input data 12 to binary representations through a process referred to as binarization. Binarization may generate an output bitstream 14 (e.g., an output sequence of ones and zeros) corresponding to the quantized input data 12.

As discussed in further detail below, aspects of embodiments of the present disclosure provide for a method of binarization, which allows for improved compression of the quantized input data 12. The additional compression component 207 may further compress portions of the output bitstream 14 to generate a further-processed output bitstream 16. As discussed in further detail below, in some embodiments, the additional compression component 207 may perform binary arithmetic coding (BAC) on portions of the output bitstream 14. In some embodiments, the additional compression component 207 may perform run-length coding (RLC) on portions of the output bitstream 14.

The output bitstream 14, generated by binarization, may have more (e.g., significantly more) ones than zeros. For example, portions of the output bitstream 14 may include about 90% ones and about 10% zeros. The further compression performed by the additional compression component 207 may provide the further-processed output bitstream 16 with a distribution of ones and zeros, corresponding to the output bitstream 14, that is closer to 50% ones and 50% zeros and having fewer bits than the corresponding portions of the output bitstream 14. A rate control component 209 of the encoder 252 may perform a rate control operation based on the further-processed output bitstream 16 to manage the prediction, transformation, and/or quantization operations performed by the PTQ 201.

In some embodiments, the additional compression component 207 my not be included in the encoder 252 or may be bypassed, such that additional compression operations (e.g., BAC and/or RLC) are not performed on the output bitstream 14. The output of the coding circuit 204 may correspond to the MCA-parameter data 10 (e.g., the compressed MCA-parameter data 10).

In some embodiments, the output data from the output of the coding circuit 204 (e.g., the output bitstream 14 or the further-processed output bitstream 16) may be saved to (e.g., stored in) memory 6 (see FIG. 1). In some embodiments, the encoder 252 may be removed from the display device 1 after the display device 1 leaves the factory.

The codec 250 may include a decoder 254. The decoder 254 may perform inverse operations from those of the encoder 252 to generate the reconstructed image data 30 (e.g., a reconstructed MCA-parameter image). An inverse additional compression component 211 may perform operations that are the inverse of the operations performed by the additional compression component 207. An inverse binarization component 213 may perform operations that are the inverse of operations performed by the binarization component 205. In other words, the decoder 254 may perform the decoding operations 19. The input to the decoder 254 may correspond to an input of a decoding circuit 214 (e.g., an entropy decoding circuit). The input to the decoding circuit 214 may be based on the output of the coding circuit 204.

In some embodiments, the decoding circuit 214 may receive the output data, from the output of the coding circuit 204, from the memory 6. In some embodiments, the decoding circuit 214 may receive data associated with the output bitstream 14 as a first input bitstream 24. In some embodiments, the decoding circuit 214 may receive data associated with the further-processed output bitstream as a combined bitstream input 26. For example, in some embodiments, which include the additional compression component 207 and the inverse additional compression component 211, the decoding circuit 214 may generate the first input bitstream 24 based on the combined bitstream input 26. For example, and as discussed in further detail below with reference to FIGS. 7A and 7B, the additional compression component 207 may generate combined bitstreams CBS (e.g., CBS1, CBS2, and CBS3), and the decoding circuit 214 may generate the first input bitstream 24 by performing inverse operations (e.g., decompression operations) on the combined bitstreams CBS.

Figure 3A:
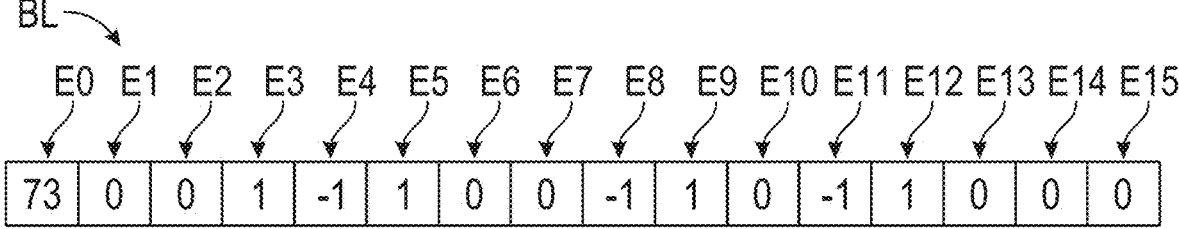
FIG. 3A is a diagram depicting a block of quantized coefficients to be processed, which are associated with a luma channel, according to some embodiments of the present disclosure.

FIG. 3A is a diagram depicting a block of quantized coefficients to be processed, which are associated with a luma channel, according to some embodiments of the present disclosure.

Referring to FIG. 3A, a block BL (of quantized coefficients) may be a continuous string of numbers. Each number may have a position within the block BL based on elements of the block BL. In some embodiments, the blocks BL for a luma channel may include 16 elements (e.g., E0 through E15). Each element may correspond to a different quantized coefficient of the MCA parameters. The quantized coefficients of the block BL may be in decimal format. For example, element E0, which corresponds to the first coefficient of the block BL may have a value of 73; elements E1 and E2 may have values of 0; element E3 may have a value of 1; element E4 may have a value of −1; element E5 may have a value of 1; elements E6 and E7 may have values of 0; element E8 may have a value of −1; element E9 may have a value of 1; element E10 may have a value of 0; element E11 may have a value of −1; element E12 may have a value of 1; elements E13, E14, and E15 may have values of 0. Unlike some codecs, embodiments of the present disclosure may not divide blocks BL into groups. The block BL of FIG. 3A may be encoded in (e.g., converted to) a binary representation as discussed below with respect to FIG. 3D.

Figure 3B:
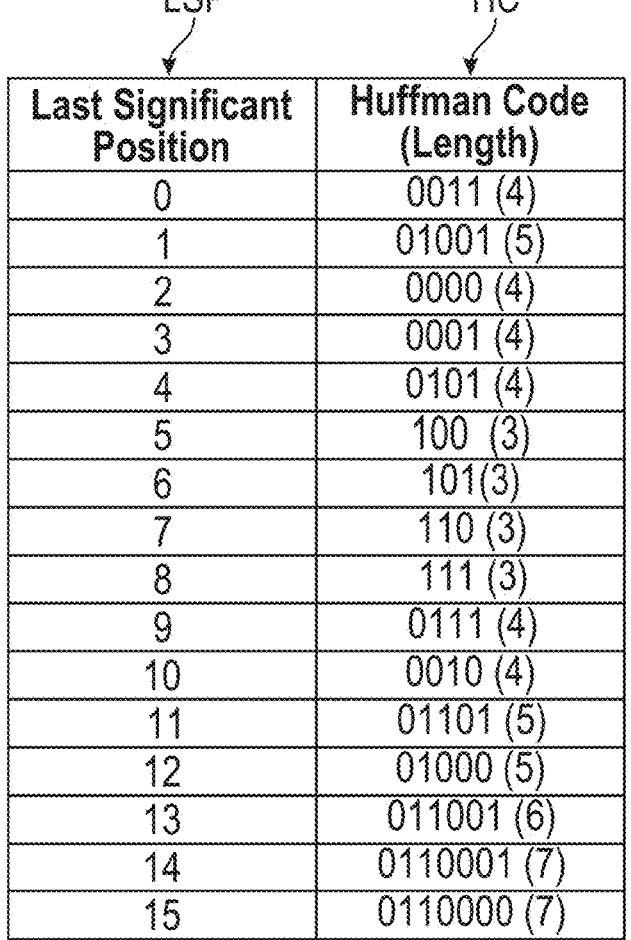
FIG. 3B is a table depicting a code for encoding some portions of the block of quantized coefficients of FIG. 3A, according to some embodiments of the present disclosure.

FIG. 3B is a table depicting a code for encoding some portions of the block of quantized coefficients of FIG. 3A, according to some embodiments of the present disclosure.

Referring to FIG. 3B, in some embodiments, a last significant bit position may be provided to a decoder first. The last significant bit position may be provided by a last-significant-position indicator LSP. The last-significant-position indicator LSP may indicate the location of the last non-zero coefficient of the block BL. The last-significant-position indicator LSP may be encoded according to a Huffman code HC. Huffman codebook may be suitable for representing more common values (e.g., values 5-9) with fewer bits than less common values (e.g., values 0-4 and 10-15).

Figures 3C, 3D:
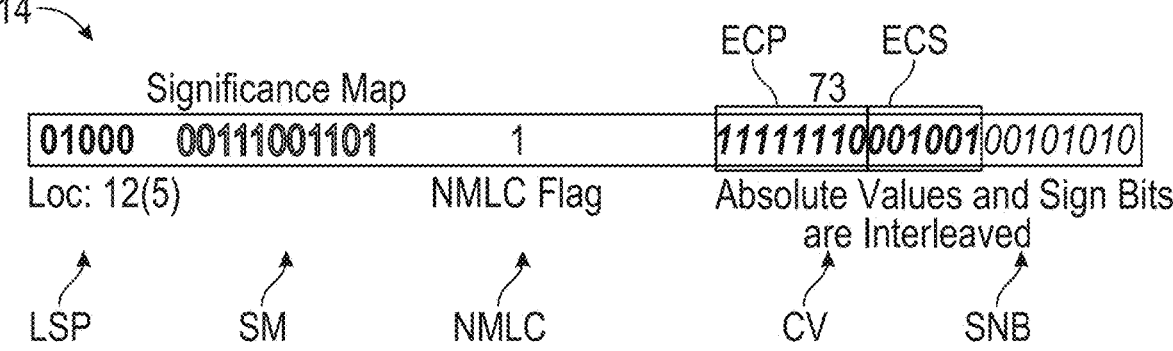
FIG. 3C is a table depicting a code for encoding some other portions of the block of quantized coefficients of FIG. 3A, according to some embodiments of the present disclosure.
FIG. 3D is a diagram depicting an output bitstream corresponding to the block of quantized coefficients of FIG. 3A, according to some embodiments of the present disclosure.

FIG. 3C is a table depicting a code for encoding some other portions of the block of quantized coefficients of FIG. 3A, according to some embodiments of the present disclosure.

Referring to FIG. 3C, in some embodiments, absolute values of the coefficient values CV may be encoded according to an Exponential-Golomb code. For example, the value of 73 may be represented by an Exponential-Golomb code prefix of seven ones and one zero (e.g., 11111110) followed by an Exponential-Golomb code suffix of the six-bit-binary value that could be added to 64 to equal 73 (e.g., 001001).

FIG. 3D is a diagram depicting an output bitstream corresponding to the block of quantized coefficients of FIG. 3A, according to some embodiments of the present disclosure.

Referring to FIG. 3D, the output bitstream 14 representing the block BL of FIG. 3A may include the last-significant-position indicator LSP of 01000, based on the Huffman code for 12 to indicate that element E12 is the last significant position (e.g., the last element including a non-zero value). The output bitstream 14 representing the block BL of FIG. 3A may include a significance map SM of 00111001101. In some embodiments, the significance map SM may not include bits representing the first coefficient of a luma channel (e.g., E0) and/or the last significant coefficient because this information may already be conveyed through the last-significant-position indicator LSP. For example, it may be assumed that the first coefficient of the luma channel (e.g., E0) is significant (even when it is zero) and, thus, a significance bit may not be provided in the significance map SM for the first coefficient. An absolute value of the first coefficient may be sent to provide the information. Accordingly, the significance map SM of 00111001101 may be provided to indicate that elements E1 and E2 are zero, elements E3 through E5 are non-zero, elements E6 and E7 are zero, elements E8 and E9 are non-zero, element E10 is zero, and element E11 (e.g., the last coefficient before the last-significant position) is non-zero.

In some embodiments, a no-more-large-coefficients (NMLC) flag may be set to 1 to indicate that all the coefficients (e.g., a plurality of consecutive coefficients), in the block BL (e.g., a set of quantized coefficients), following the first coefficient (e.g., E0) have absolute values that are less than or equal to 1. Based on the NMLC flag indicating that all the coefficients following element E0 have absolute values that are less than or equal to 1, the output bitstream 14 may simply be provided with the absolute value of the first coefficient (e.g., 73) based on the Exponential-Golomb code for 73 (e.g., 11111110001001), as discussed above, and the sign bits SNB for all non-zero bits. For example, 8 bits may be used to indicate the signs of the 8 non-zero coefficients of the block BL of FIG. 3A, with 0 indicating a positive value and 1 indicating a negative value (e.g., 00101010). In some embodiments, when the first element is assumed to be non-zero, a zero value for element E0 may be indicated by sending the code for zero as the coefficient value CV.

In some embodiments, when the NMLC flag is not set (e.g., is zero), the absolute value of the first coefficient may be provided in the Exponential-Golomb code, while the remaining coefficients may be provided based on their absolute value minus one, in the Exponential-Golomb code. In some embodiments, the sign bits SNB for all non-zero coefficients may be interleaved with their corresponding coefficient values CV.

Figure 4:
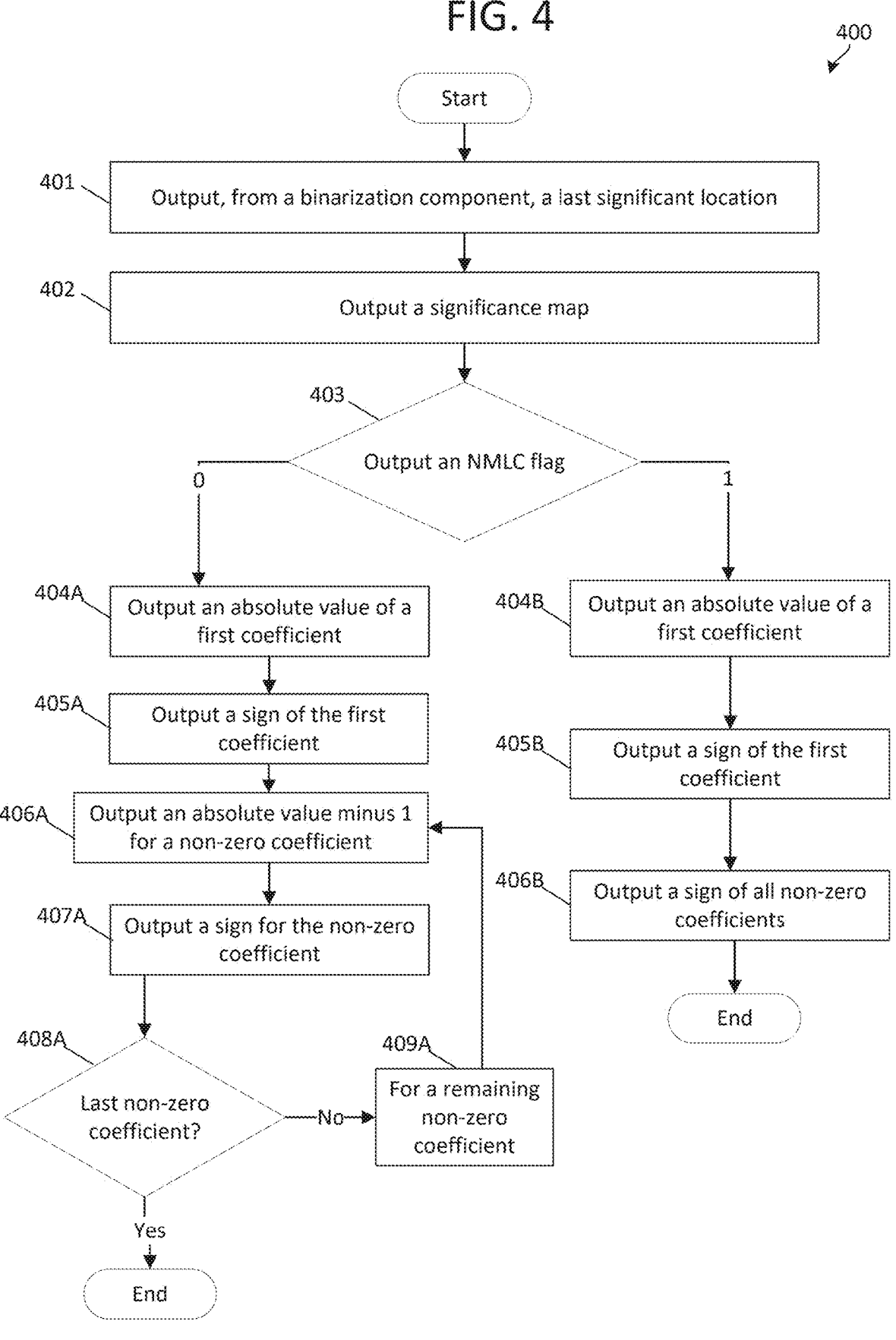
FIG. 4 is a flowchart depicting example operations of a method for processing data associated with a luma channel, according to some embodiments of the present disclosure.

FIG. 4 is a flowchart depicting example operations of a method for processing data associated with a luma channel, according to some embodiments of the present disclosure.

Referring to FIG. 4, the method 400 summarizes the discussion above regarding FIGS. 3A to 3D. For example, the output bitstream 14 may be provided with (e.g., by outputting from the binarization component) the code for the last-significant-position indicator LSP (operation 401). The output bitstream 14 may be provided with the significance map SM (operation 402). The output bitstream 14 may be provided with an NMLC flag that is 0 or 1, with 0 indicating that not all of the coefficients following the first coefficient are equal to or less than one and with 1 indicating that all of the coefficients following the first coefficient are equal to or less than one (operation 403).

If (e.g., when) the NMLC flag is 0, the output bitstream 14 may be provided with the absolute value of the first coefficient (operation 404A); the output bitstream 14 may be provided with the sign of the first coefficient (operation 405A); the output bitstream 14 may be provided with the absolute value minus 1 (operation 406A) and the sign (operation 407A) for the next non-zero coefficient; if the processing circuit determines that there are more non-zero coefficients (operation 408A) and (operation 409A), the absolute values minus 1 (operation 406A) and signs (operation 407A) for the remaining non-zero coefficients may be provided to the output bitstream 14, until there are no remaining non-zero coefficients.

If the NMLC flag is set to 1, the output bitstream 14 may be provided with the absolute value of the first coefficient (operation 404B); the output bitstream 14 may be provided with the sign of the first coefficient (operation 405B) and the signs of all remaining non-zero coefficients (operation 406B). Accordingly, the NMLC flag being set to 1 allows for a significant reduction in bits to represent a given block BL for a luma channel. The characteristics (e.g., properties) of the MCA image data may cause the NMLC flags to be set to 1 frequently (e.g., about 80% to about 90% of the time).

Figure 5A:
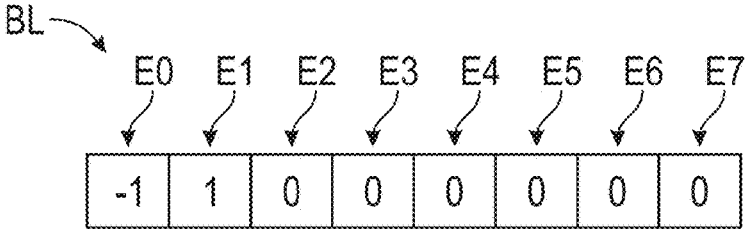
FIG. 5A is a diagram depicting a block of quantized coefficients to be processed, which are associated with a chroma channel, according to some embodiments of the present disclosure.

FIG. 5A is a diagram depicting a block of quantized coefficients to be processed, which are associated with a chroma channel, according to some embodiments of the present disclosure.

Referring to FIG. 5A, a block BL (of quantized coefficients) may be a continuous string of numbers. Each number may have a position within the block BL based on elements of the block BL. In some embodiments, the blocks BL for a chroma channel may include 8 elements (e.g., E0 through E7). Each element may correspond to a different quantized coefficient of the MCA parameters. The quantized coefficients of the block BL may be in decimal format. For example, element E0, which corresponds to the first coefficient of the block BL, may have a value of –1; elements E1 may have a value of 1; and elements E2 through E7 may have values of 0. Unlike some codecs, embodiments of the present disclosure may not divide blocks BL into groups. The block BL of FIG. 5A may be encoded in (e.g., converted to) a binary representation as discussed below with respect to FIG. 5C.

Figure 5B:
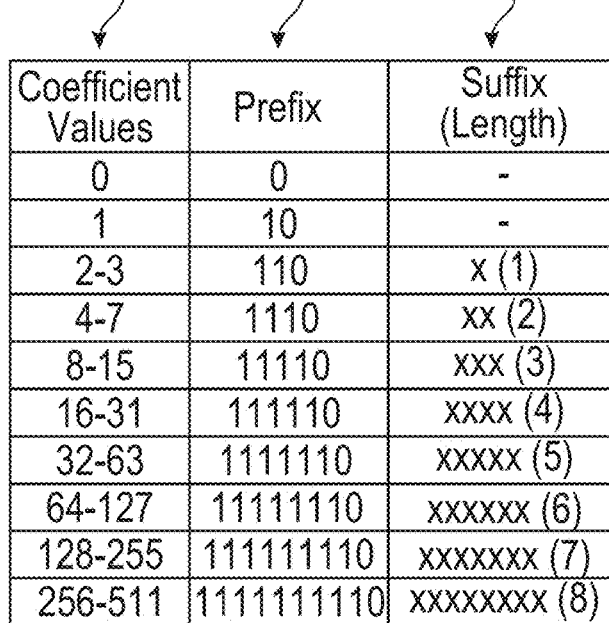
FIG. 5B is a table depicting a code for encoding some portions of the block of quantized coefficients of FIG. 5A, according to some embodiments of the present disclosure.

FIG. 5B is a table depicting a code for encoding some portions of the block of quantized coefficients of FIG. 5A, according to some embodiments of the present disclosure.

Referring to FIG. 5B, in some embodiments, absolute values of the coefficient values CV may be encoded according to an Exponential-Golomb code when a no-large-coefficients (NLC) flag is not set to 1 (e.g., is zero), in a manner similarly discussed with respect to FIG. 3C. For example, if the NLC flag indicates that all the coefficients (e.g., a plurality of consecutive coefficients) in the block BL, including the first coefficient of the block BL, have absolute values that are less than or equal to 1, the absolute values minus one may be provided to the output bitstream 14. In some embodiments, the absolute values minus one may be interleaved with their sign bits SNB.

Figure 5C:
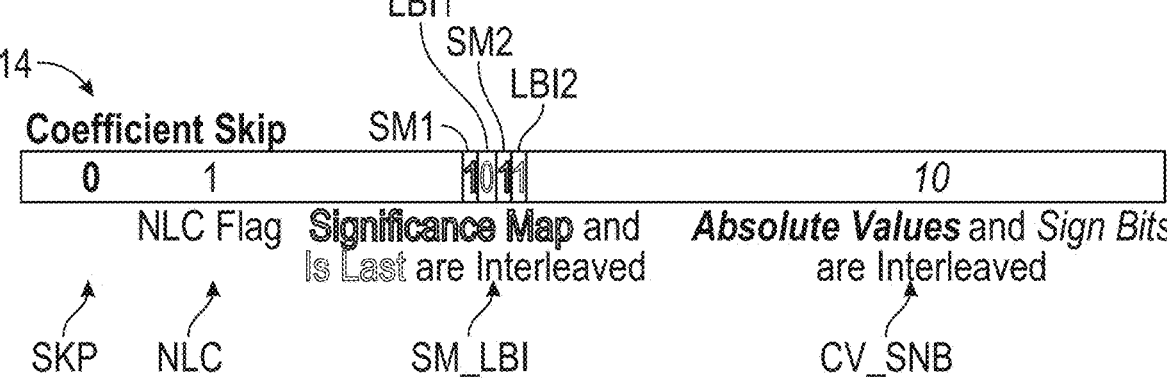
FIG. 5C is a diagram depicting an output bitstream corresponding to the block of quantized coefficients of FIG. 5A, according to some embodiments of the present disclosure.

FIG. 5C is a diagram depicting an output bitstream corresponding to the block of quantized coefficients of FIG. 5A, according to some embodiments of the present disclosure.

Referring to FIG. 5C, the output bitstream 14 representing the block BL of FIG. 5A may include a skip flag SKP (e.g., a coefficient-skip flag). In some embodiments, the skip flag SKP may be set to 1 when all chroma coefficients are zeros, which tends to occur about 45% of the time. Unlike with the output bitstream 14 associated with luma channels, the output bitstream 14 associated with chroma channels may not include a last-significant-position indicator LSP.

The skip flag SKP may not be set to 1 (e.g., may be 0) when not all of the chroma coefficients are zeros (e.g., when some of the chroma coefficients are non-zero). Due to the characteristics (e.g., properties) of MCA image data, the first coefficients associated with chroma channels tend to be lower than the first coefficients associated with luma channels. Accordingly, the output bitstream 14 representing the block BL of FIG. 5A may include an NLC flag, instead of an NMLC flag, to indicate that all the coefficients in the block BL, including the first coefficient of the block BL, have absolute values that are less than or equal to 1. In the example of FIG. 5A, all coefficients of the block BL have absolute values of 1 or 0. So, the NLC flag is set to 1. The skip flag SKP being set to 0 may be referred to as a state (e.g., a first state indicating that one or more of the coefficients in a block BL have absolute values that are greater than zero). The skip flag SKP being set to 1 may be referred to as a state (e.g., a second state indicating that all of the coefficients in a block BL are equal to zero).

The output bitstream 14 may be provided with a significance map SM indicating all bits that are non-zero. In some embodiments, the significance map SM may be interleaved with a last-bit indicator LBI. For example, a first significance map portion SM1 may be a 1 bit to indicate that element E0 is non-zero. The first significance map portion SM1 may be followed by a first last-bit indicator LBI1 that is 0 to indicate that the first significance map portion SM1 is not the last significant bit of the block BL. A second significance map portion SM2 may be a 1 bit to indicate that element E1 is non-zero. In some embodiments, a last-bit indicator LBI may only be sent for non-zero elements. In other words, if the significance bit for an element is 0, then a last-bit indicator LBI may not be sent for this element. The second significance map portion SM2 may be followed by a second last-bit indicator LBI2 that is 1 to indicate that the second significance map portion SM2 is the last significant bit of the block BL. Because all of the non-zero coefficients are 1, coefficient values CV may not be provided to the output bitstream 14, and only sign bits SNB may be provided to the output bitstream 14. For example, the sign bits SNB may indicate that the element E0 has a negative value (e.g., 1 may indicate a negative value) and that the element E1 has a positive value (e.g., 0 may indicate a positive value).

In some embodiments, when the NLC flag is not set (e.g., is zero), the absolute values of all the coefficients of the block BL may be provided to the output bitstream 14 based on the absolute values minus one, in the Exponential-Golomb code. In some embodiments, the sign bits SNB for all non-zero coefficients may be interleaved with their corresponding coefficient values CV.

Figure 6:
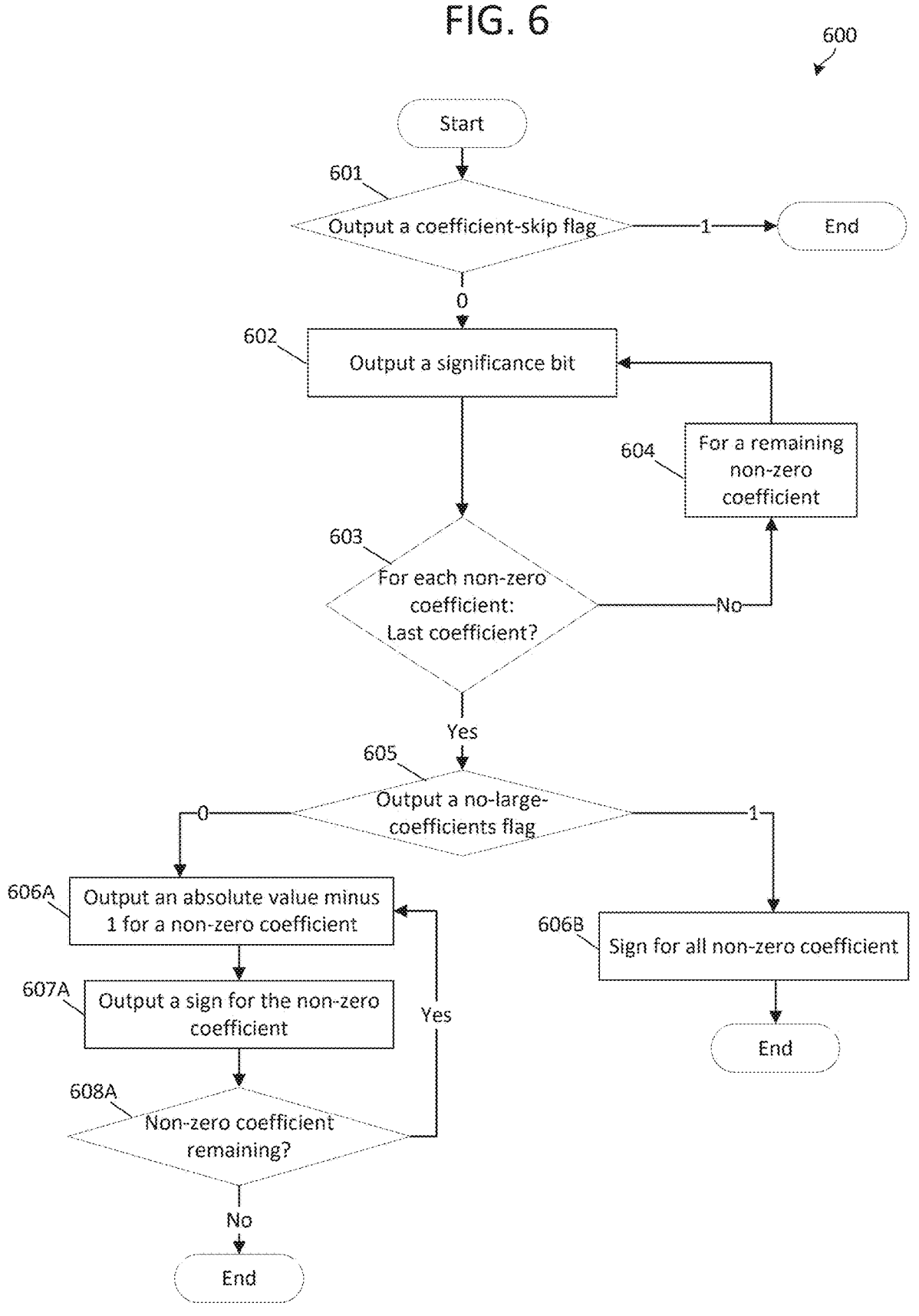
FIG. 6 is a flowchart depicting a method for processing data associated with a chroma channel, according to some embodiments of the present disclosure.

FIG. 6 is a flowchart depicting a method for processing data associated with a chroma channel, according to some embodiments of the present disclosure.

Referring to FIG. 6, the method 6 summarizes the discussion above regarding FIGS. 5A to 5C. For example, the output bitstream 14 may be provided with (e.g., by outputting from the binarization component) a coefficient-skip flag (operation 601), with a 1 indicating that all coefficients of the block B1 are zeros and a 0 indicating that not all coefficients of the block BL are zeros (e.g., some of the coefficients of the block are non-zero).

If the coefficient-skip flag is set to 1, the block may be skipped. If the coefficient-skip flag is zero, then a significance bit (of the significance map MP) may be provided to the output bitstream 14 (operation 602), followed by a last-bit indicator LBI, indicating whether the significance bit is the last non-zero bit (operation 603). If the last-bit indicator LBI indicates that the significance bit is not the last non-zero bit (operation 604), the next significance bit (of the significance map MP) may be provided to the output bitstream 14 (operation 602), followed by a last-bit indicator LBI, indicating whether the next significance bit is the last non-zero bit (operation 603). In some embodiments, the last-bit indicator LBI may only be provided when a significance bit is 1. In other words, the last-bit indicator LBI may not be provided when a significance bit is 0.

If the last-bit indicator LBI indicates that a significance bit is the last non-zero bit, a determination may be made as to whether there are large coefficients in the block BL (operation 605). If there are large coefficients in the block BL (e.g., the NLC flag is zero), the absolute value minus 1 and sign bit SNB for each remaining non-zero coefficient may be provided to the output bitstream 14 (operations 606A-608A). If there are no large coefficients in the block BL (e.g., the NLC flag is set to 1), the absolute value minus 1 may not be sent for any coefficients of the block and only sign bits SNB for all non-zero coefficients in the block BL may be sent (operation 606B). Accordingly, the NLC flag being set to 1 allows for a significant reduction in bits to represent a given block BL for a chroma channel.

Figures 7A, 7B:
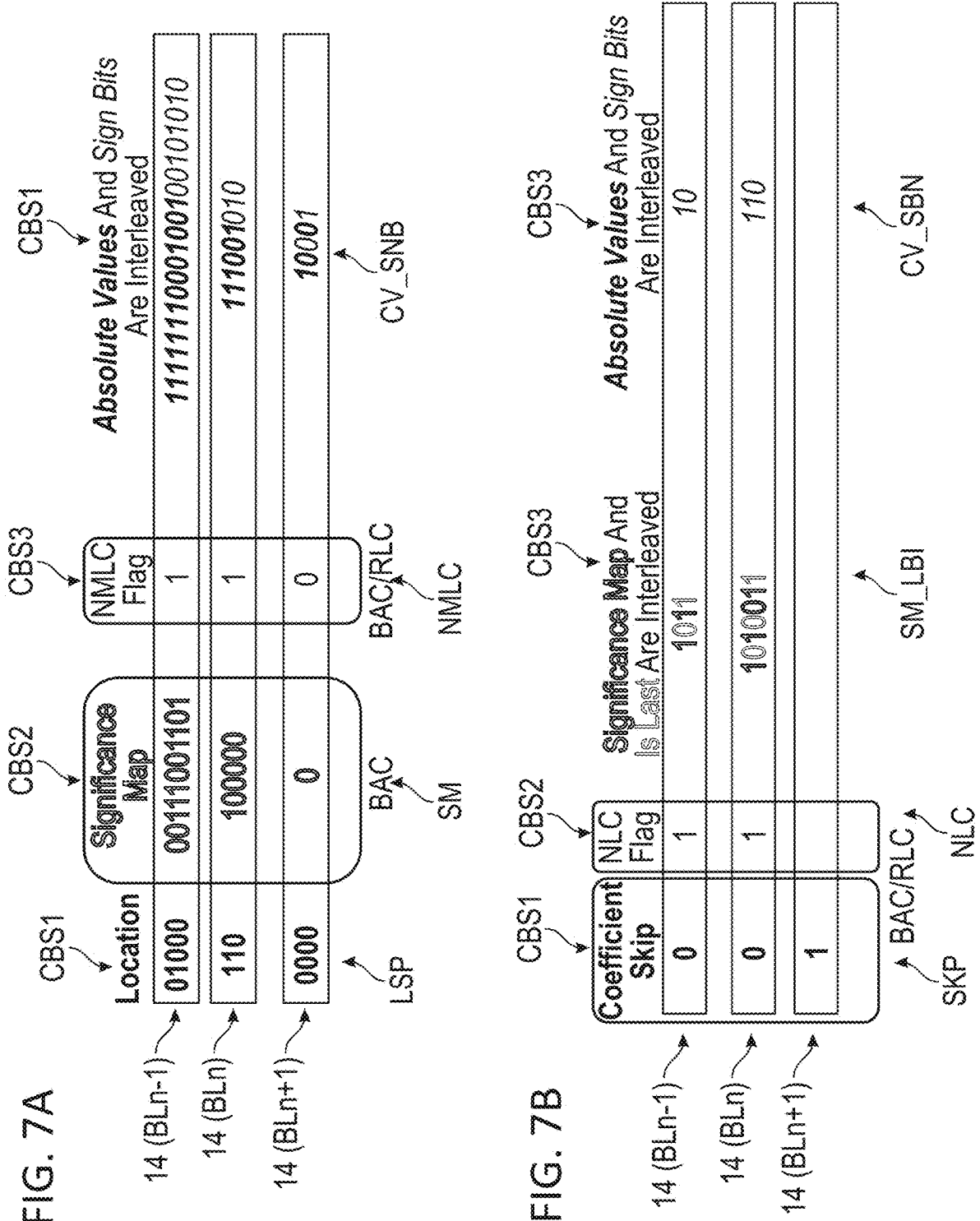
FIG. 7A is a diagram depicting a method for parallel processing of data associated with a luma channel, according to some embodiments of the present disclosure.
FIG. 7B is a diagram depicting a method for parallel processing of data associated with a chroma channel, according to some embodiments of the present disclosure.

FIG. 7A is a diagram depicting a method for parallel processing of data associated with a luma channel, according to some embodiments of the present disclosure.

FIG. 7B is a diagram depicting a method for parallel processing of data associated with a chroma channel, according to some embodiments of the present disclosure.

Referring to FIGS. 7A and 7B, portions of the output bitstream 14 associated with a given block BL (e.g., an n–1-th block BLn–1) may be separated from other portions of the output bitstream 14 associated with the same block BL (e.g., an n–1-th block BLn–1), combined with other like portions of the output bitstream 14 associated with other blocks BL (e.g., an n-th block BLn and an n+1-th block BLn+1) into a combined bitstream CBS (e.g., CBS1, CBS2, or CBS3), and processed separately from other combined bitstreams CBS. Accordingly, the codec 250 (see FIG. 2) may allow for parallel processing of the combined bitstreams CBS, which may allow for more decoding to be performed in fewer clock cycles.

Additionally, some of the combined bitstreams CBS may have more 1s than 0s, or more 0s than 1s, allowing them to benefit from further compression processing by the additional compression component 207 (see FIG. 2). For example, in some embodiments, the additional compression component 207 may perform BAC or RLC on one or more of the combined bit streams CBS. Some of the combined bitstreams CBS that would not benefit from BAC or RLC may bypass the processing by the additional compression component 207.

In some embodiments, as discussed above with reference to FIG. 2, the decoding circuit 214 (see FIG. 2) may generate the first input bitstream 24 by performing inverse operations (e.g., decompression operations and/or separation operations) on the combined bitstreams CBS. For example, the decoding circuit 214 may receive a first combined bitstream including significance maps SM (e.g., CBS2 of FIG. 7A, in the case of luma channels) or skip flags SKP (e.g., CBS1 of FIG. 7B, in the case of chroma channels) from different blocks BL. The decoding circuit 214 may receive a second bitstream including NMLC flags (e.g., CBS3 of FIG. 7A, in the case of luma channels) or NLC flags (e.g., CBS2 of FIG. 7B, in the case of chroma channels) from different blocks BL. The decoding circuit 214 may generate the first input bitstream 24 by performing inverse operations of the operations that are performed to generate the combined bitstreams CBS. In some embodiments, the inverse operations may be performed in parallel. For example, the decoding circuit 214 may process the first combined bitstream separately from the second combined bitstream. For example, the combined bitstream input may include more than one separate combined bitstreams.

Referring to FIG. 7A, the significance maps SM associated with luma channels and/or the NMLC flags associated with luma channels may benefit from BAC or RLC, while the last-significant-position indicators LSP and/or the coefficient values interleaved with sign bits CV_SNB may not benefit from BAC or RLC.

Referring to FIG. 7B, the skip flags SKP and/or the NLC flags associated with chroma channels may benefit from BAC or RLC, while the significance map interleaved with last-bit indicators SM_LBI and/or the coefficient values interleaved with sign bits CV_SNB may not benefit from BAC or RLC. In some embodiments, the combined bitstreams CBS may be three different pointers.

Figure 8:
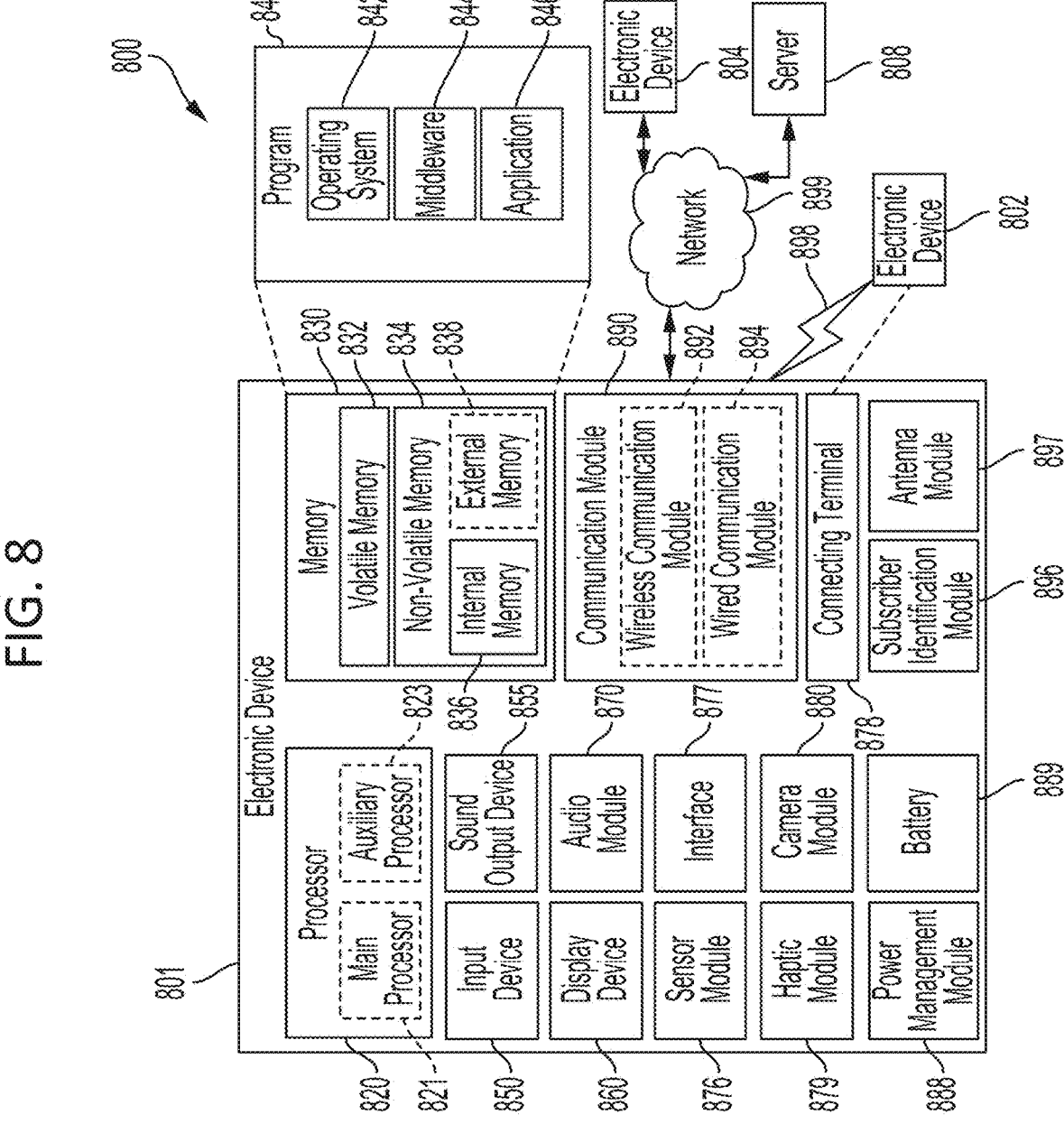
FIG. 8 is a block diagram of an electronic device in a network environment, according to some embodiments of the present disclosure.

FIG. 8 is a block diagram of an electronic device in a network environment 800, according to some embodiments of the present disclosure.

Referring to FIG. 8, an electronic device 801 in a network environment 800 may communicate with an electronic device 802 via a first network 898 (e.g., a short-range wireless communication network), or an electronic device 804 or a server 808 via a second network 899 (e.g., a long-range wireless communication network). The electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) card 896, or an antenna module 897. In one embodiment, at least one (e.g., the display device 860 or the camera module 880) of the components may be omitted from the electronic device 801, or one or more other components may be added to the electronic device 801. Some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute software (e.g., a program 840) to control at least one other component (e.g., a hardware or a software component) of the electronic device 801 coupled with the processor 820 and may perform various data processing or computations.

As at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. The processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). The auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834. Non-volatile memory 834 may include internal memory 836 and/or external memory 838.

The program 840 may be stored in the memory 830 as software, and may include, for example, an operating system (OS) 842, middleware 844, or an application 846.

The input device 850 may receive a command or data to be used by another component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. The display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. The audio module 870 may obtain the sound via the input device 850 or output the sound via the sound output device 855 or a headphone of an external electronic device 802 directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. The sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device 802 directly (e.g., wired) or wirelessly. The interface 877 may include, for example, a high-definition multimedia interface (HDMI), a universal serial bus (USB) interface, a secure digital (SD) card interface, or an audio interface.

A connecting terminal 878 may include a connector via which the electronic device 801 may be physically connected with the external electronic device 802. The connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. The haptic module 879 may include, for example, a motor, a piezo-electric element, or an electrical stimulator.

The camera module 880 may capture a still image or moving images. The camera module 880 may include one or more lenses, image sensors, image signal processors, or flashes. The power management module 888 may manage power supplied to the electronic device 801. The power management module 888 may be implemented as at least part of, for example, a power management integrated circuit (PMIC).

The battery 889 may supply power to at least one component of the electronic device 801. The battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. The communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as BLUETOOTH™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. The antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

Commands or data may be transmitted or received between the electronic device 801 and the external electronic device 804 via the server 808 coupled with the second network 899. Each of the electronic devices 802 and 804 may be a device of a same type as, or a different type, from the electronic device 801. All or some of operations to be executed at the electronic device 801 may be executed at one or more of the external electronic devices 802 or 804, or at the server 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

Figure 9:
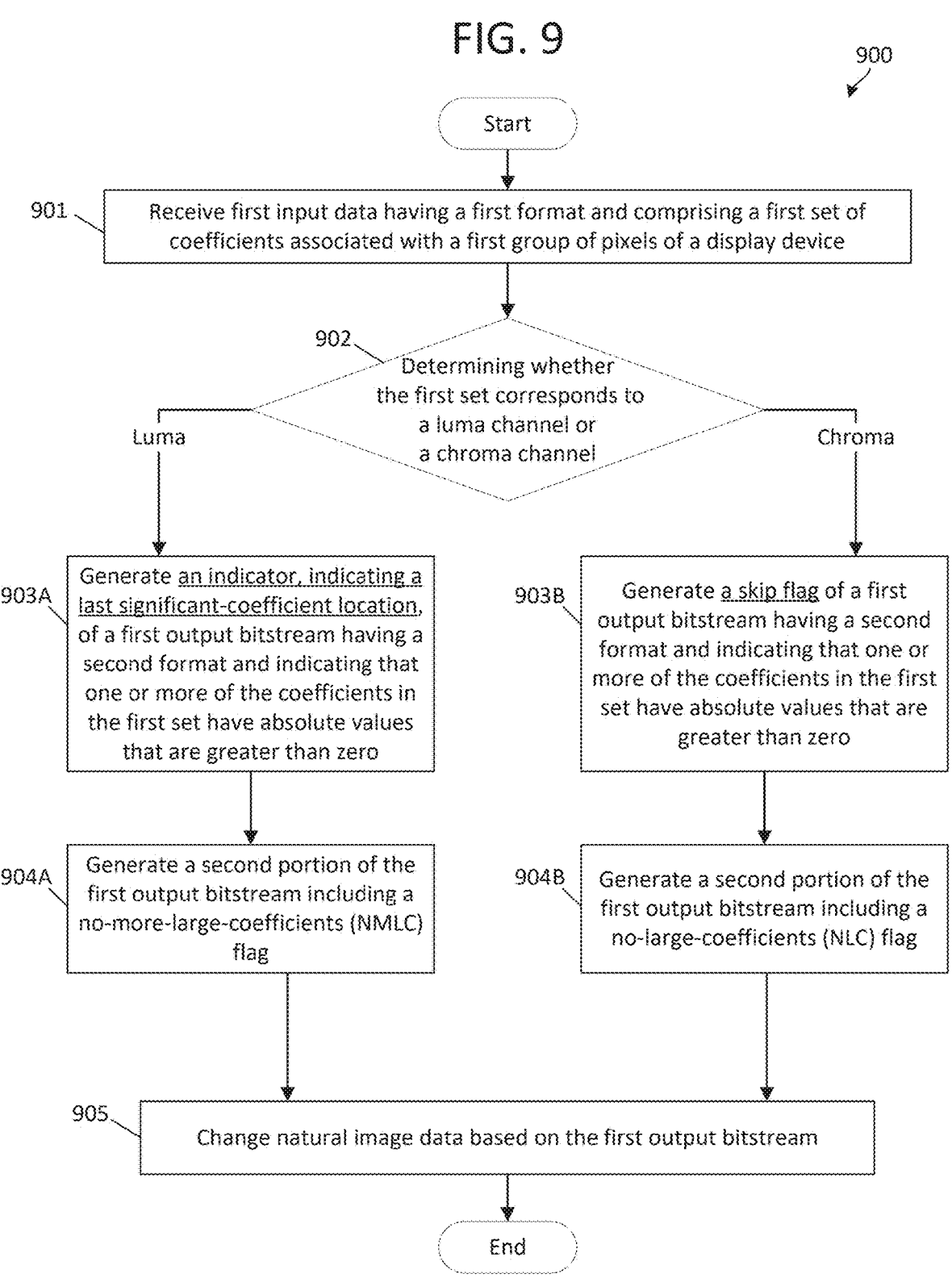
FIG. 9 is a flowchart depicting a method for processing data associated with luma channels and/or chroma channels, according to some embodiments of the present disclosure.

FIG. 9 is a flowchart depicting a method for processing data associated with luma channels and/or chroma channels, according to some embodiments of the present disclosure.

Referring to FIG. 9, a method 900 for processing data may include one or more of the following operations. An encoder 252 (e.g., at a coding circuit 204) may receive input data 12 (see FIG. 2) having a first format (e.g., a decimal format) and comprising a first set of coefficients, in a block BL (see FIGS. 3A and 5A), associated with a first group of pixels G of a display device 2 (see FIG. 1A) (operation 901). For example, an MCA-parameter image 30 may be provided to encoder 252 and input data 12 may be generated for processing by the coding circuit 204. The coding circuit 204 may determine whether the first set corresponds to a luma channel (see FIG. 3A) or a chroma channel (see FIG. 5A) (operation 902).

Based on determining that the first set corresponds to a luma channel (see FIG. 3A), the coding circuit 204 may generate a first portion (e.g., a last-significant-position indicator LSP or a significance map SM) of an output bitstream 14 having a second format (e.g., binary) and indicating that one or more of the coefficients (e.g., a plurality of consecutive coefficients) in the first set have absolute values that are greater than zero (operation 903A), and may generate a second portion of the output bitstream 14 including a no-more-large-coefficients (NMLC) flag (operation 904A). A processing circuit 4 (see FIG. 1A) may change natural image data 7 based on the output bitstream 14 (operation 905).

Based on determining that the first set corresponds to a chroma channel (see FIG. 5A), the coding circuit 204 may generate a first portion (e.g., a skip flag SKP or a significance map SM) of an output bitstream 14 having a second format (e.g., binary) and indicating that one or more of the coefficients (e.g., a plurality of consecutive coefficients) in the first set have absolute values that are greater than zero (operation 903B), and may generate a second portion of the output bitstream 14 including a no-large-coefficients (NLC) flag (operation 904B). The processing circuit 4 (see FIG. 1A) may change natural image data 7 based on the output bitstream 14 (operation 905).

The method 900 may be performed on one or more components of the electronic device 801 of FIG. 8. For example, one or more operations may be performed using a combination of software components and hardware components corresponding to the processor 820 and the memory 830 of FIG. 8.

FIG. 10 is a flowchart depicting a method for processing data by a decoder, according to some embodiments of the present disclosure.

Referring to FIG. 10, a method 1000 for processing data by a decoder 254 (see FIG. 2) may include one or more of the following operations. A decoding circuit 214 may receive a first input bitstream 24 and/or a combined bitstream input 26 (see FIG. 2) (operation 1001). The input bitstream may include: (i) a first set of coefficients associated with the first group of pixels G of the display device 2, the first set of coefficients having a first format (e.g., a compressed, binary format) (see FIGS. 3D and 5C); (ii) a first portion (e.g., an indicator indicating a last significant-coefficient location (LSP), a significance map (SM), or a skip flag (SKP)) indicating that one or more of the coefficients in the first set have absolute values that are greater than zero;

and (iii) a second portion (e.g., a no-more-large-coefficients (NMLC) flag or a no-large-coefficients (NLC) flag) indicating that a plurality of consecutive coefficients in the first set have absolute values that are less than or equal to a first value (e.g., 1).

The first input bitstream 24 (see FIG. 2) may be generated based on the output bitstream 14 and the further-processed output bitstream 16 from the coding circuit 204. The first input bitstream 24 may be generated based on a combined bitstream input 26. For example, if the additional compression component 207 performs BAC operations and/or RLC operations on the output bitstream 14 to generate the further-processed output bitstream 16, the inverse additional compression component 211 may perform inverse BAC operations and/or inverse RLC operations on the combined bitstream input 26 to generate the first input bitstream 24. If, on the other hand, the additional compression component 207 is not included in the encoder 252 or is bypassed in the encoder 252, such that no BAC operations and/or no RLC operations are performed on the output bitstream 14, the first input bitstream 24 may correspond more directly (e.g., directly) to the output bitstream 14.

The decoder 254 (e.g., by way of the decoding circuit 214) may generate decoding circuit output data 22 (e.g., an inverse binarization output) having a second format (e.g., a decompressed, or partially decompressed, decimal format) that is different from the first format. For example, the decoder 254 may perform inverse operations of operations performed on the input data 12 by the coding circuit 204 (operation 1002). The processing circuit 4 (see FIG. 1A) may change the natural image data 7 based on the decoding circuit output data 22 (see FIGS. 1A and 2) (operation 1003). For example, the processing circuit 4 may change the natural image data 7 based on the reconstructed image data 30 that is generated based on the decoding circuit output data 22. The decoding circuit output data 22 (see FIG. 2) may be generated based on the output bitstream 14 and the first input bitstream 24. In some embodiments, the decoding circuit output data 22 may also be generated based on the further-processed output bitstream 16 and the combined bitstream input 26.

In some embodiments, the output data from the encoder 252 may be saved (e.g., stored) in the memory 6, and the decoder 254 may receive its input from the memory 6. For example, output data generated from the output bitstream 14 and/or the further-processed output bitstream 16 may be stored in the memory 6, and the decoder 254 may receive the combined bitstream input 26 or the first input bitstream 24 from the memory 6. For example, in some embodiments, the encoder 252 may be used at a factory to encode data and may be removed from the display device 1 after the encoded data is stored to the memory 6.

The method 1000 may be performed on one or more components of the electronic device 801 of FIG. 8. For example, one or more operations may be performed using a combination of software components and hardware components corresponding to the processor 820 and the memory 830 of FIG. 8.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method for processing data, the method comprising:
receiving, by a decoding circuit, a first input bitstream comprising:
a first set of coefficients associated with a first group of pixels of a display device, the first set of coefficients having a first format that is different from a second format associated with an output data of the decoding circuit;
a first portion indicating that one or more of the coefficients in the first set have absolute values that are greater than zero; and
a second portion indicating that each of a plurality of consecutive coefficients in the first set has an absolute value that is less than or equal to a first value, a single bit of the second portion indicating that each of the plurality of the consecutive coefficients in the first set has the absolute value that is less than or equal to the first value; and
changing image data for displaying an image on the display device, based on the first input bitstream.

2. The method of claim 1, wherein:
the plurality of consecutive coefficients comprises all the coefficients in the first set;
the second portion comprises a no-large coefficients (NLC) flag; and
the first set corresponds to a chroma channel associated with the first group of pixels.

3. The method of claim 1, wherein:
the plurality of consecutive coefficients comprises all the coefficients in the first set following a first coefficient of the first set;
the second portion comprises a no-more-large coefficients (NMLC) flag; and
the first set corresponds to a luma channel associated with the first group of pixels.

4. The method of claim 1, wherein the first value is one.

5. The method of claim 1, wherein the first portion comprises at least one of an indicator indicating a last significant-coefficient location, a significance map, or a skip flag.

6. The method of claim 5, wherein:
the first portion comprises the indicator indicating the last significant-coefficient location; and
the indicator is encoded in accordance with a Huffman codebook.

7. The method of claim 5, wherein the first portion comprises the significance map, and
the significance map comprises bits representing each coefficient in the first set, from a first coefficient to a last significant coefficient, except for bits representing the first coefficient or the last significant coefficient.

8. The method of claim 5, wherein:
the first portion comprises the significance map; and
the significance map comprises one or more significant bits and one or more last-bit indicator bits, one of the one or more last-bit indicator bits indicating that an adjacent significant bit is a last significant bit.

9. The method of claim 5, wherein:
the first set corresponds to a chroma channel associated with the first group of pixels;
the first portion comprises the skip flag in a first state; and
the skip flag is configured to indicate, in a second state, that all of the coefficients in the first set are equal to zero.

10. The method of claim 1, further comprising generating the first input bitstream based on:

a first combined bitstream comprising the first portion associated with the first set of coefficients associated with the first group of pixels and comprising a first portion associated with a second set of coefficients associated with a second group of pixels; and a second combined bitstream comprising the second portion associated with the first set of coefficients associated with the first group of pixels and comprising a second portion associated with the second set of coefficients associated with the second group of pixels.

11. The method of claim 10, wherein the generating the first input bitstream based on the first combined bitstream and the second combined bitstream comprises performing a decompression operation on the first combined bitstream or the second combined bitstream.

12. The method of claim 11, wherein the decompression operation comprises an inverse binary arithmetic coding (BAC) operation or an inverse run-length coding (RLC) operation.

13. The method of claim 1, wherein the first input bitstream comprises a third portion comprising indicator bits indicating absolute values of one or more of the coefficients in the first set interleaved with indicator bits indicating signs of the one or more of the coefficients in the first set.

14. The method of claim 13, wherein the absolute values are encoded in accordance with an Exponential-Golomb codebook.

15. The method of claim 13, wherein:

the first set corresponds to a luma channel associated with the first group of pixels;

a first coefficient in the first set is represented by an encoded form of its actual absolute value; and at least one of the coefficients in the first set, following the first coefficient of the first set, has an absolute that is represented by an encoded form of a value that is equal to an absolute value of the at least one of the coefficients minus one.

16. The method of claim 1, wherein:

the first set corresponds to a luma channel associated with the first group of pixels, and the method further comprises decoding the first set based on assuming that an absolute value of a first coefficient of the luma channel is significant.

17. A system for data processing, the system comprising:

a processing circuit; and a memory storing instructions, which, when executed by the processing circuit, cause the processing circuit to perform:

receiving, at a decoder, a first input bitstream comprising:

a first set of coefficients associated with a first group of pixels of a display device, the first set of coefficients having a first format that is different from a second format associated with an output data of the decoder;

a first portion indicating that one or more of the coefficients in the first set have absolute values that are greater than zero; and a second portion indicating that each of a plurality of consecutive coefficients in the first set has an absolute value that is less than or equal to a first value, a single bit of the second portion indicating that each of the plurality of the consecutive coefficients in the first set has the absolute value that is less than or equal to the first value; and changing image data for displaying an image on the display device, based on the first input bitstream.

18. The system of claim 17, wherein the plurality of consecutive coefficients comprises one of:

all the coefficients in the first set; or all the coefficients in the first set following a first coefficient of the first set.

19. A system for data processing, the system comprising:

a processing circuit; and a memory storing instructions, which, when executed by the processing circuit, cause the processing circuit to perform:

receiving, at an encoder, input data comprising a first set of coefficients associated with a first group of pixels of a display, the first set of coefficients having a first format;

generating a first output bitstream, representing the first set of coefficients in a second format that is different from the first format, the first output bitstream comprising:

a first portion indicating that one or more of the coefficients in the first set have absolute values that are greater than zero; and a second portion indicating that each of a plurality of consecutive coefficients in the first set has an absolute value that is less than or equal to a first value, a single bit of the second portion indicating that each of the plurality of the consecutive coefficients in the first set has the absolute value that is less than or equal to the first value; and changing image data, for displaying an image on the display, based on the first output bitstream.

20. The system of claim 19, wherein the plurality of consecutive coefficients comprises one of:

all the coefficients in the first set; or all the coefficients in the first set following a first coefficient of the first set.

* * * * *